US012158077B2

(12) United States Patent
    Andrews

(10) Patent No.: US 12,158,077 B2
(45) Date of Patent: Dec. 3, 2024

(54) COMPACT TURBINE-COMPRESSOR ASSEMBLY

(71) Applicant: Nathan Geoffrey Andrews, Queensland (AU)

(72) Inventor: Nathan Geoffrey Andrews, Queensland (AU)

( * ) Notice: Subject to any disclaimer, the term of this patent is extended or adjusted under 35 U.S.C. 154(b) by 0 days.

(21) Appl. No.: 17/800,843

(22) PCT Filed: Feb. 19, 2021

(86) PCT No.: PCT/AU2021/050141
    § 371 (c)(1),
    (2) Date: Aug. 18, 2022

(87) PCT Pub. No.: WO2021/163760
    PCT Pub. Date: Aug. 26, 2021

(65) Prior Publication Data
    US 2023/0080760 A1    Mar. 16, 2023

(30) Foreign Application Priority Data
    Feb. 19, 2020  (AU) .............................. 2020900471

(51) Int. Cl.
    *F01D 25/12*       (2006.01)
    *F02B 39/08*       (2006.01)
(52) U.S. Cl.
    CPC .............. *F01D 25/12* (2013.01); *F02B 39/08* (2013.01); *F05D 2220/40* (2013.01); *F05D 2260/213* (2013.01)
(58) Field of Classification Search
    CPC ......... B64D 13/06; F01D 25/12; F01D 9/026; F02B 33/40; F02B 37/00; F02B 39/08;
    (Continued)

(56) References Cited

U.S. PATENT DOCUMENTS 2,548,975 A  *  4/1951  Rede ....................... F02C 3/073
                                                         416/93 R
3,303,993 A     2/1967  Andrews et al.
                        (Continued)

FOREIGN PATENT DOCUMENTS

JP    2019536977 A    12/2019
KR    100316394 B1     2/2002

OTHER PUBLICATIONS

International Search Report and Written Opinion in corresponding International Application No. PCT/AU2021/050141 dated Jun. 16, 2021, 8 pages.
(Continued)

*Primary Examiner* — Jesse S Bogue
(74) *Attorney, Agent, or Firm* — MH2 TECHNOLOGY LAW GROUP LLP

(57) ABSTRACT

There is provided a compact turbine-compressor assembly 25. The turbine-compressor assembly 25 includes a turbine wheel 39 with one or more turbine blades 41 and a compressor wheel 47 that includes one or more compressor blades 49. The compressor wheel 47 is concentric with the turbine wheel 39. Furthermore, the compressor wheel 47 and the turbine wheel 39 are not located at opposite ends of a common axle with a medial portion of the axle distancing them apart, as is the case with prior art turbine-compressor assemblies that are known. In contrast, the turbine wheel 39 and the compressor wheel 47 are located adjacent to each other and in one embodiment they axially overlap each other so that one nests within the other to thereby provide a compact arrangement. The turbine-compressor assembly 25 includes a first fluid path 67 which is configured to convey fluid, which will typically be air, through the turbine blades 41. The turbine-compressor assembly 25 also includes a second fluid path 77 which is configured to convey fluid, which will typically be air, through the compressor blades.

(Continued)

The turbine-compressor assembly 25 is arranged so that the first fluid path 67 is distinct from the second fluid path 77 and vice-versa.

10 Claims, 10 Drawing Sheets

(58) Field of Classification Search
CPC .... F02C 3/045; F02C 3/05; F02C 6/12; F04D 25/024; F04D 29/284; F05D 2220/40; F05D 2250/36; F05D 2260/213; F25B 1/053; Y02T 10/12; Y02T 50/60
See application file for complete search history.

(56) References Cited

U.S. PATENT DOCUMENTS

| | | | |
|---|---|---|---|
| 6,263,664 B1 * | 7/2001 | Tanigawa | F01K 21/047 60/730 |
| 6,374,612 B1 | 4/2002 | Gladden et al. | |
| 6,397,577 B1 * | 6/2002 | Sondergaard | F01D 5/03 60/39.43 |
| 6,427,471 B1 * | 8/2002 | Ando | B64D 13/06 62/88 |
| 6,647,707 B2 * | 11/2003 | Dev | F02C 3/16 60/39.43 |
| 8,042,354 B1 * | 10/2011 | Dziorny | B64D 13/06 62/402 |
| 9,995,216 B1 * | 6/2018 | Rez | F01D 1/12 |
| 10,344,763 B2 * | 7/2019 | Rez | F04D 29/284 |
| 11,014,677 B2 * | 5/2021 | DeFrancesco | B64D 13/08 |
| 2007/0154304 A1 | 7/2007 | Abdallah | |
| 2016/0083099 A1 | 3/2016 | Beers et al. | |
| 2017/0175564 A1 | 6/2017 | Schlak | |
| 2019/0063313 A1 * | 2/2019 | Rez | F02C 3/145 |
| 2019/0063442 A1 | 2/2019 | Rez et al. | |

OTHER PUBLICATIONS

Mihe, Julian (EP Examiner), Communication pursuant to Rule 62 EPC issued on Feb. 13, 2024 in corresponding European Application No. 21757618.0, 7 pages.

* cited by examiner

COMPACT TURBINE-COMPRESSOR ASSEMBLY

RELATED APPLICATIONS

The present application is a U.S. national stage entry from International Application No. PCT/AU2021/050141, filed on Feb. 19, 2020, which claims priority from Australian provisional patent application No. 020900471 filed Feb. 19, 2020, the contents of which are hereby incorporated by reference in their entireties for all purposes.

TECHNICAL FIELD

The present invention relates to a compact turbine-compressor assembly being a turbomachine for use in products such as air-cycle machines (ACMs) for providing cooling for hardware and for turbochargers for improving engine performance.

BACKGROUND

Any references to methods, apparatus or documents of the prior art are not to be taken as constituting any evidence or admission that they formed, or form part of the common general knowledge.

Embodiments of the present invention will be predominantly described in the context of an air cycle machine (ACM) although other situations where turbomachinery is used, such as in turbochargers are also applicable. ACMs are used in airborne applications for providing refrigeration for applications such as air conditioning an aircraft's cabin and for cooling electronic modules.

FIG. 1 is a cross section through a typical expansion-turbine and compressor assembly (or "turbine-compressor assembly") 1 of a prior art ACM. The various parts of the turbine-compressor assembly 1 are as set out in Table 1.

TABLE 1

Item Numbers of FIG. 1

| Item Number | Part |
|---|---|
| 120 | Compressor inlet |
| 122 | Compressor scroll |
| 124 | Compressor outlet (to secondary heat exchanger) |
| 126 | Compressor impeller |
| 128 | Main housing assembly |
| 130 | Journal bearings |
| 132a, 132b | Oil Seals |
| 134 | Bearing housing |
| 136 | Sump |
| 138 | Axial shaft |
| 140 | Enlarged medial portion of axial shaft |
| 142 | Bearing assembly |
| 144 | Sump drain plug |
| 146 | Turbine scroll |
| 148 | Turbine wheel |
| 150 | Turbine inlet from secondary heat exchanger |
| 152 | Turbine outlet |

It will be observed that expansion turbine 3, including turbine wheel, 148, turbine outlet 152 and turbine scroll 146, is substantially coaxial with compressor 5, which includes compressor impeller 126, compressor inlet 120 and compressor scroll 122. Furthermore, the compressor impeller 126 and the turbine wheel 148 are rotationally coupled to opposite ends of an axial shaft 138. An enlarged medial portion 140 of the axial shaft 138 is journaled through a bearing assembly 142 centrally located in bearing housing 134. The bearing assembly 142 is lubricated with oil that collects in a sump 136 that is fitted with a drain plugged with sump drain plug 144 to assist in periodically changing the lubricating oil. Seals 132A, 132B are located at opposite ends of the bearing assembly 142. These seals 132A, 132B may pose a design problem since they are required to keep frictional losses low, cope with potentially significant movements of the axial shaft 138 due to bearing clearance and also withstand adverse pressure gradients under some conditions.

It will be realized that in all aircraft, but particularly in small aircraft such as jet fighters, space is at an absolute premium and it is desirable that weight be minimized. It would therefore be highly desirable if a more compact turbine-compressor assembly could be provided that would be suitable for use in applications such as an ACM.

It is an object of the present invention to address the above need.

SUMMARY OF THE INVENTION

According to an aspect of the present invention there is provided a turbine-compressor assembly comprising a turbine wheel and a compressor wheel wherein the turbine wheel and the compressor wheel are nested relative to each other to thereby provide a compact arrangement.

According to another aspect of the present invention there is provided a turbine-compressor assembly comprising:
a turbine wheel, including one or more turbine blades;
a compressor wheel including one or more compressor blades, the compressor wheel being concentric with and adjacent to the turbine wheel;
a first fluid path configured to convey fluid through the turbine blades;
a second fluid path configured to convey fluid through the compressor blades and distinct from the first fluid path; and
an axle extending from a support member with the turbine wheel and the compressor wheel rotatable with or about the axle.

In an embodiment the turbine wheel locates partially or entirely within the compressor wheel or vice-versa.

In an embodiment the turbine blades have an opposite pitch to the compressor blades.

In an embodiment the first fluid path comprises a turbine fluid inlet pipe fixed relative to the support member.

In an embodiment a portion of the second fluid path comprises a compressor outlet pipe fixed relative to the support member.

In an embodiment the second fluid path comprises an exhaust fluid outlet continuous with the compressor outlet pipe.

In an embodiment a portion of the first fluid path is defined by a space between an inner wall of the compressor wheel and an outer wall of the turbine wheel.

In an embodiment a portion of the second fluid path is defined by a space between an outer wall of the compressor wheel and a compressor housing.

In an embodiment the axle comprises a shaft.

In an embodiment a bore which receives the shaft is formed axially through the turbine-compressor assembly.

In an embodiment the turbine-compressor assembly includes a heat exchanger to thereby provide a ACM.

In an embodiment the heat exchanger includes a first side arranged for passage of air from an outlet of the first fluid path to an inlet of the second fluid path.

In an embodiment the heat exchanger includes a second side for conveying a fluid to be cooled.

According to a further aspect of the present invention there is provided a turbine-compressor assembly comprising:
  a turbine wheel, including one or more turbine blades;
  a compressor wheel including one or more compressor blades, the compressor wheel being concentric with and adjacent the turbine wheel;
  a first fluid path for the turbine blades; and
  a second fluid path for the compressor blades.

In an embodiment the assembly further includes an axle extending from a support member for rotation of the turbine wheel and the compressor wheel about an axis of the axle.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 2:
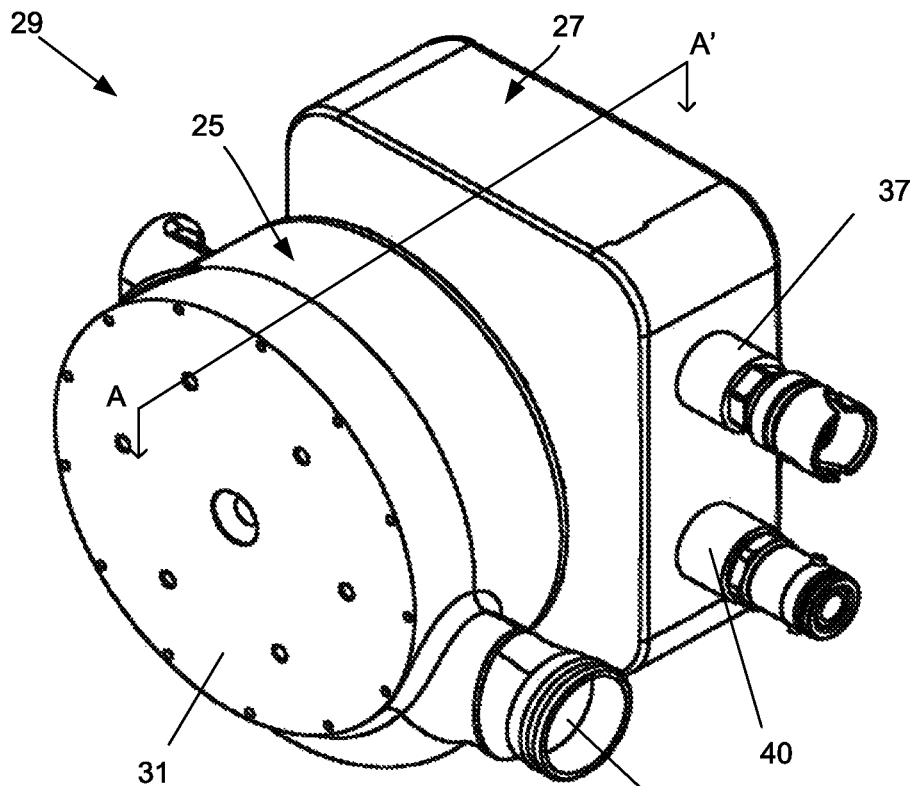
FIG. 2 is an isometric view of an ACM according to an embodiment of the present invention.
Figure 3:
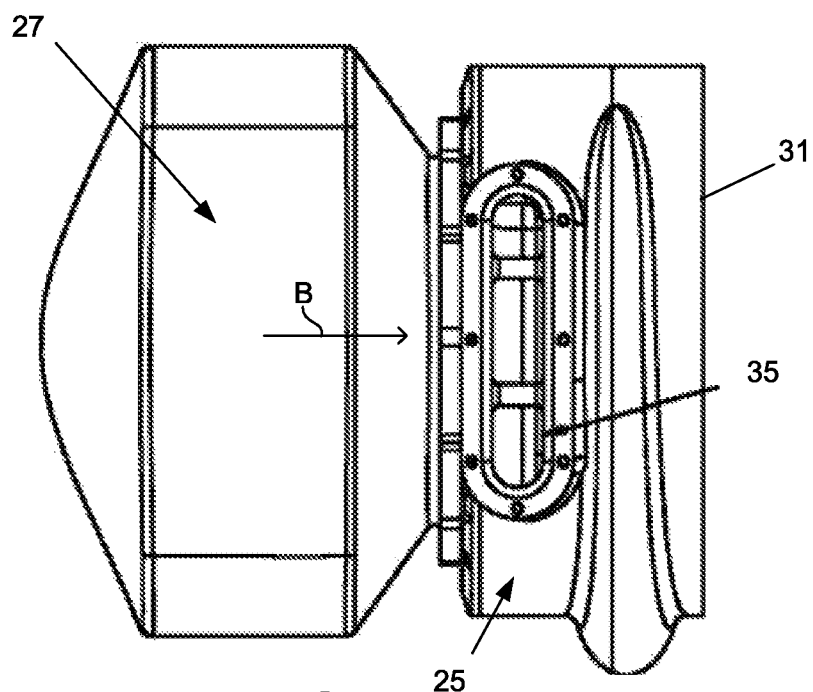
FIG. 3 is a side view of the ACM of FIG. 2.

FIG. 2 is an isometric view a turbine-compressor assembly 25 according to an embodiment, shown fitted to a heat exchanger 27 to thereby provide an ACM 29. Heat exchanger 27 includes a warm fluid inlet port 37 and a cooled fluid outlet port 40. A cover 31 is fitted over an end of the turbine-compressor assembly 25. The cover 31 is formed with a fluid inlet port 33 for passing high pressure, ambient temperature air to the turbine-compressor assembly 25. Where the turbine-compressor assembly 25 is mounted in an aircraft the fluid inlet port 33 receives RAM air due to the motion of the aircraft in flight. FIG. 3 is a further view of the ACM 29 showing an exhaust fluid outlet 35 which is coupled to an outlet from the turbine-compressor assembly 25 as will be explained.

Figure 4:
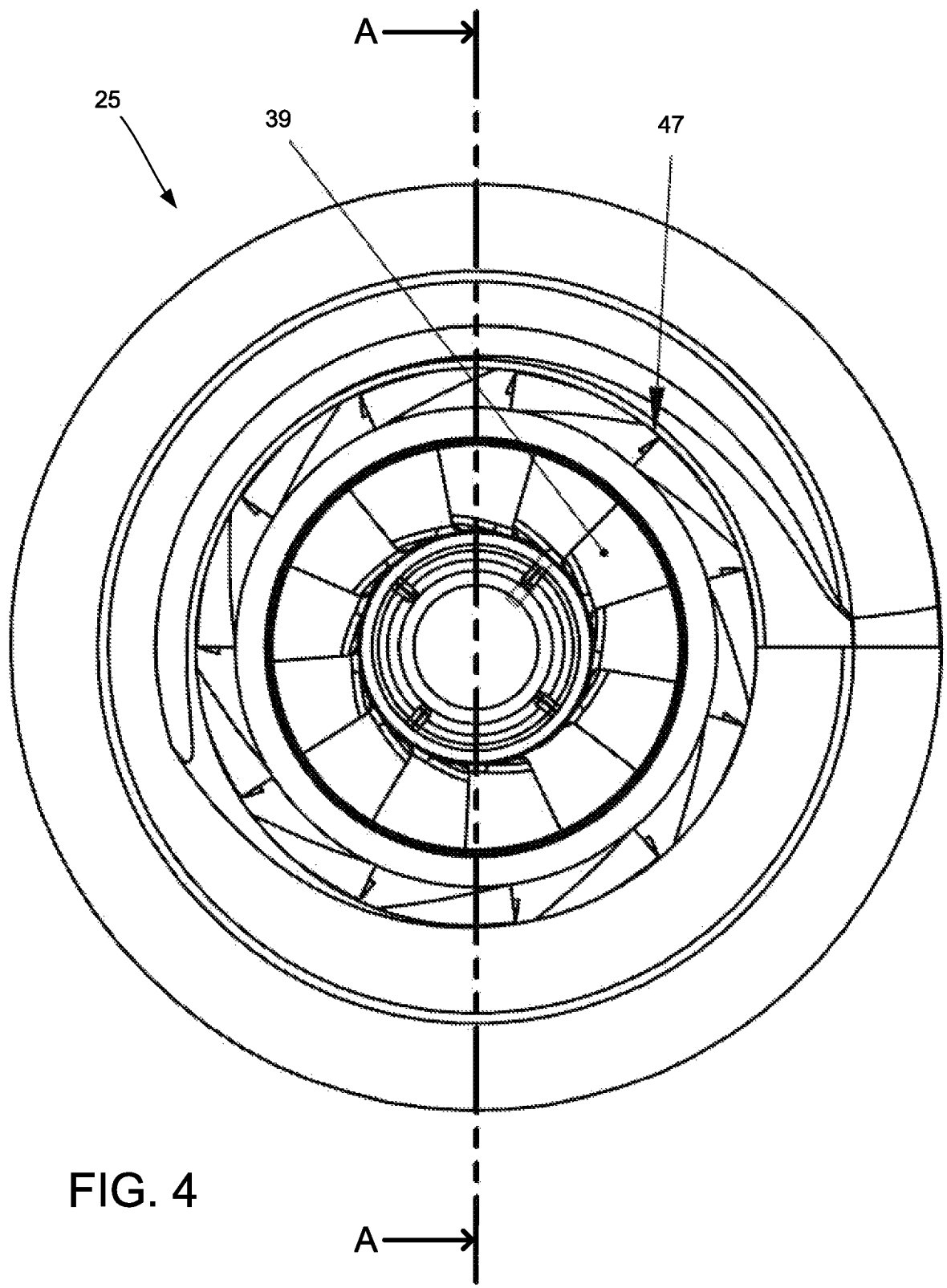
FIG. 4 is a plan view of a turbine-compressor assembly of the ACM of FIG. 2 according to an embodiment of the present invention.
Figure 5:
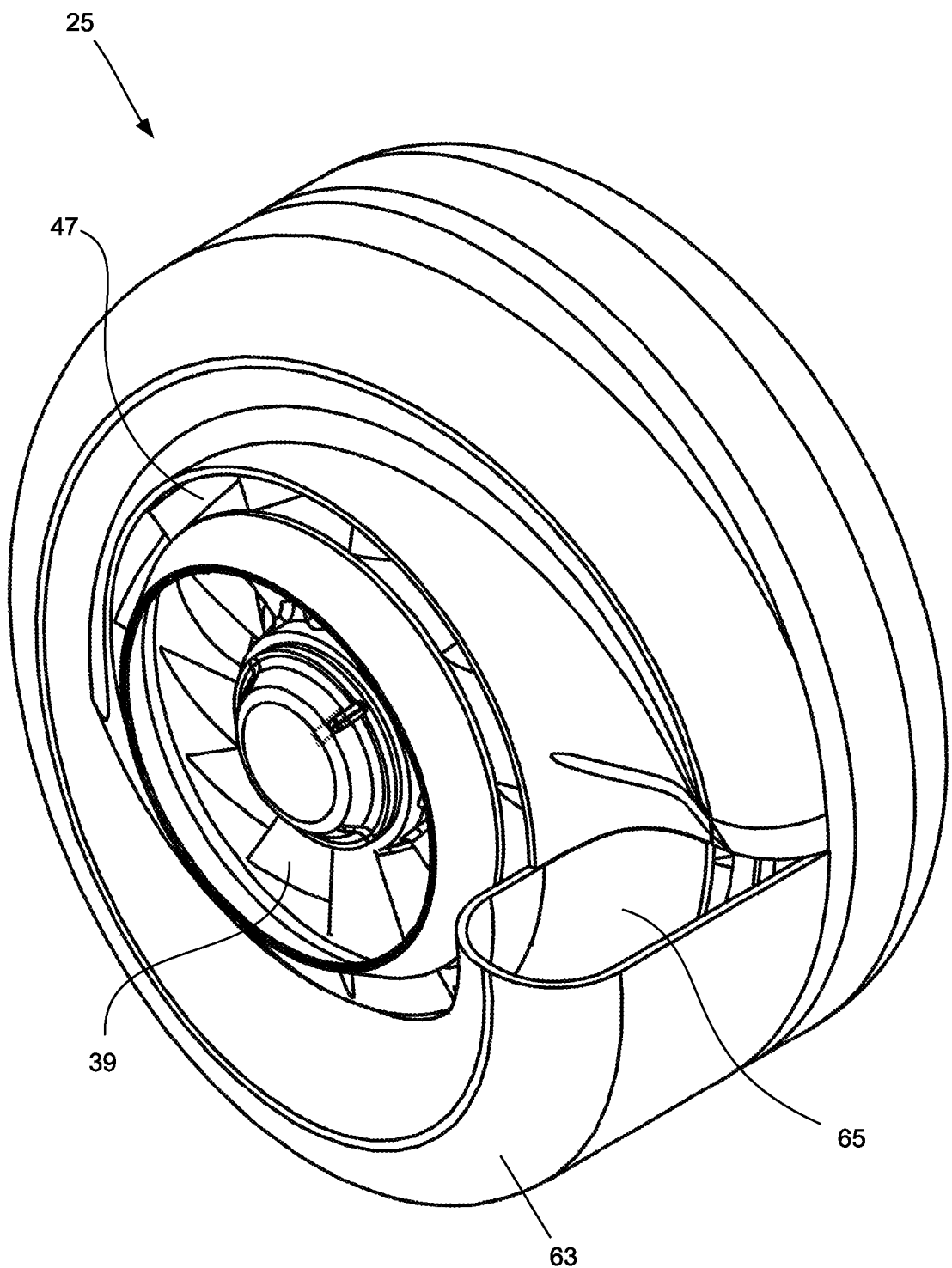
FIG. 5 is an isometric view of the turbine-compressor assembly of FIG. 4.
Figure 6:
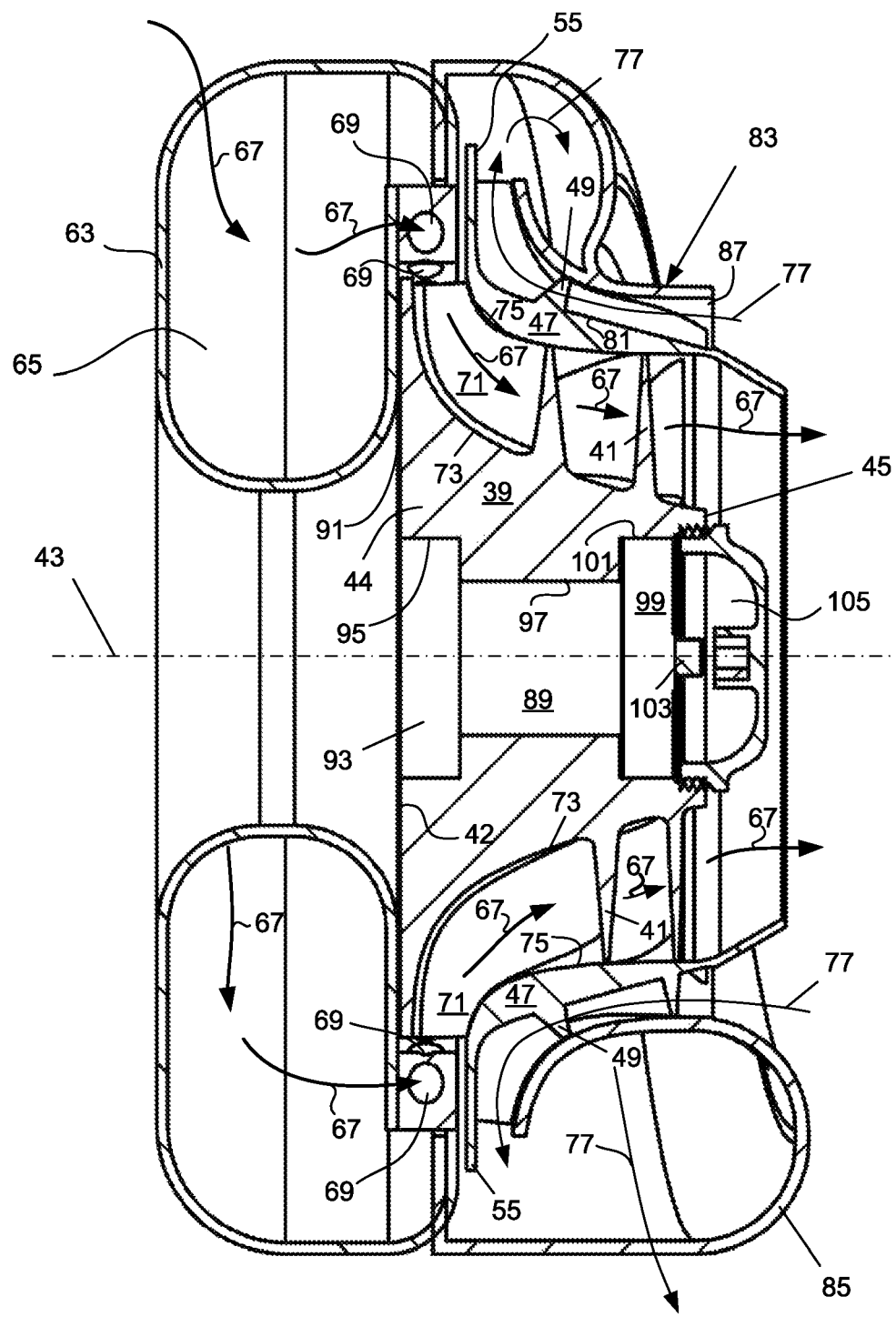
FIG. 6 is a cross sectional view of the turbine-compressor assembly indicating first and second fluid paths therethrough.

FIG. 4 is a plan view of the turbine-compressor assembly 25, with the heat exchanger 27 and cover 31 having been removed, along the line of sight indicated by arrow B of FIG. 3. FIG. 5 is an isometric view of the turbine-compressor assembly 25 whereas FIG. 6 is a cross sectional view of the turbine-compressor assembly 25 through the line A-A indicated in FIG. 4.

The turbine-compressor assembly 25 comprises a turbine wheel 39 which includes one or more turbine blades 41. In the present embodiment the turbine blades 41 comprise thirteen turbine blades that extend radially away from axis 43 about which they rotate, and which are equiangularly spaced from each other. Turbine wheel 39 includes a hub 44 from which each of the turbine blades 41 extend. The hub 44 is generally frustoconical and extends axially from a base 42 to a nose 45 of smaller diameter.

Figure 8:
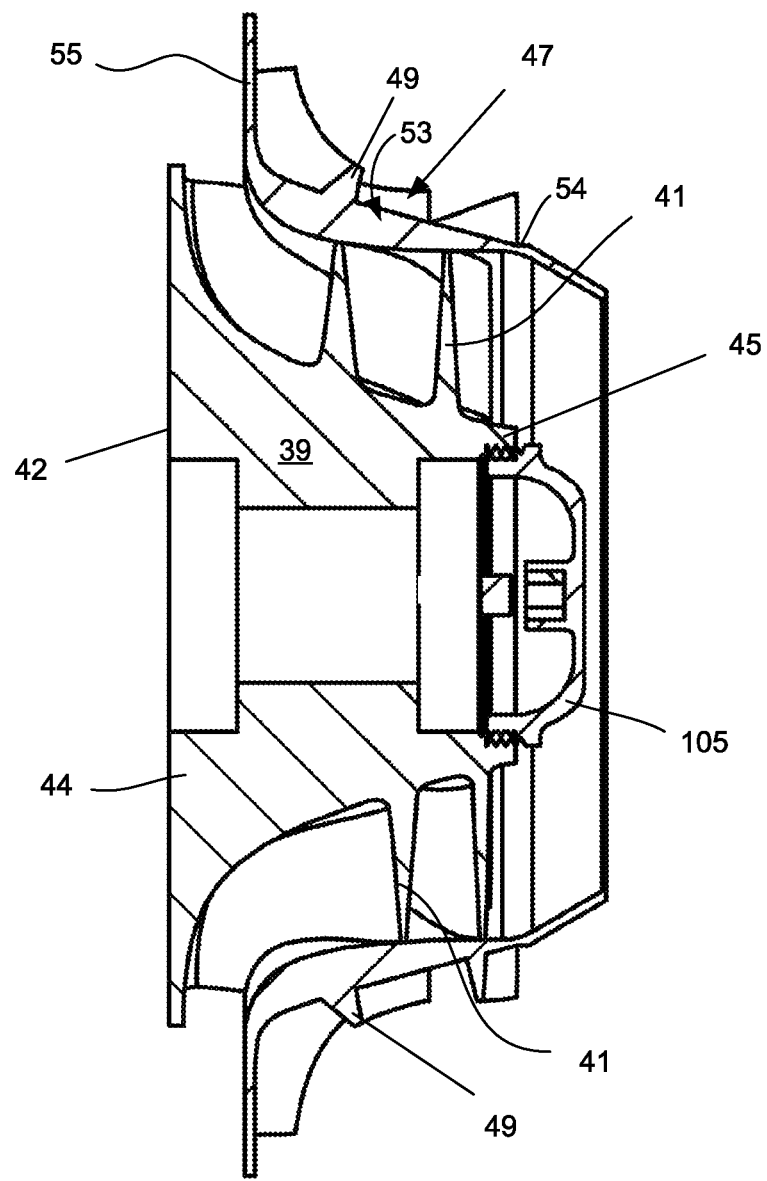
FIG. 8 is a cross section of various components of the turbine-compressor assembly including the turbine wheel and the compressor wheel.

As best seen in FIG. 8, turbine wheel 39 nests within a compressor wheel 47 with which it is concentric and fixed thereto. Accordingly, in the illustrated embodiment the turbine-compressor assembly 25 comprises a turbine wheel 39 and a compressor wheel 47 wherein the turbine wheel 39 and the compressor wheel 47 are nested relative to each other to thereby provide a compact arrangement.

Figure 7:
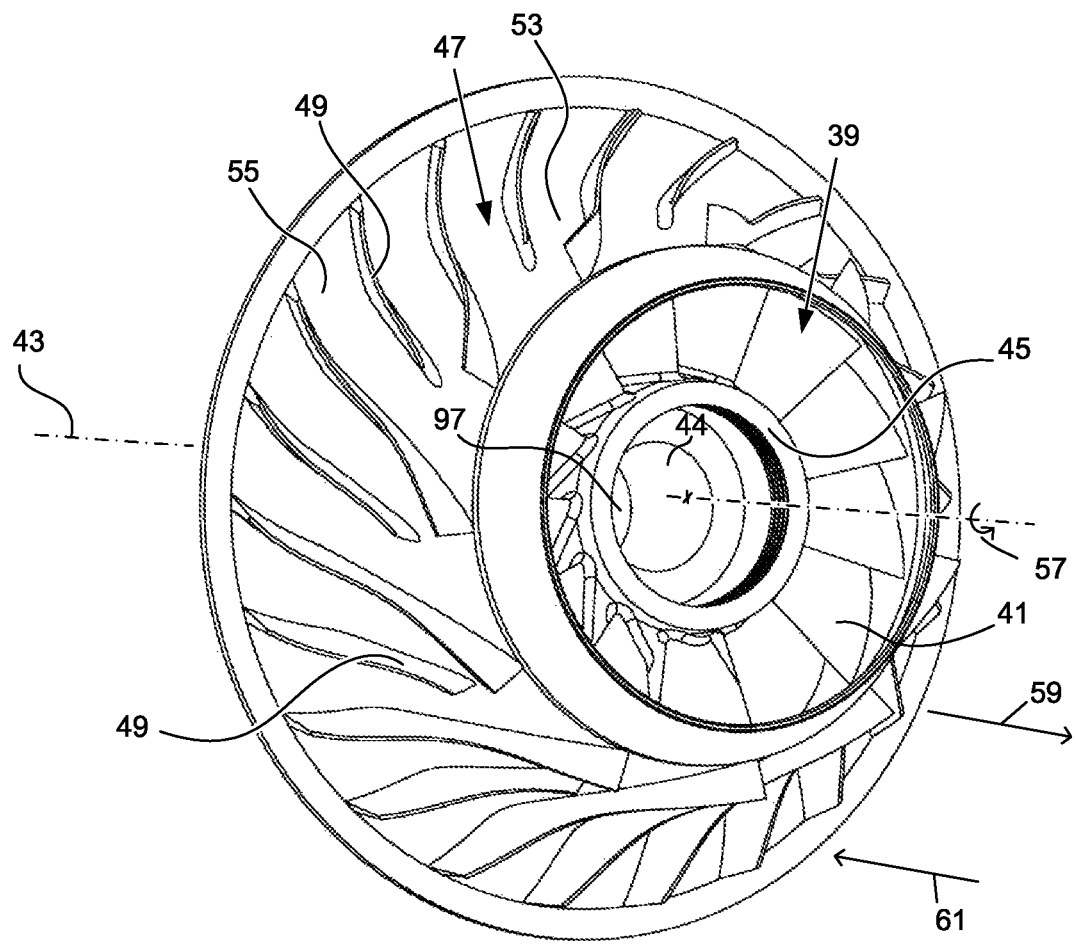
FIG. 7 is a view of a turbine wheel and compressor wheel of the turbine-compressor assembly.

Compressor wheel 47 includes a frustoconical portion 53 that extends from an axial position 54 (identified in FIG. 8) that is adjacent nose 45, outwardly therefrom to a radial skirt 55. One or more compressor blades 49, including both full and split blades, are located down the frustoconical portion 53 and on the radial skirt 55. In the present embodiment the compressor blades 49 number twenty-two blades. The turbine blades 41 and the compressor blades 49 are pitched in opposite directions, that is they have opposite pitch, to assist in providing acceleration of fluid therethrough. In other embodiments the turbine blades and the compressor blades are not necessarily pitched in opposite directions. Accordingly, forcing air through the turbine wheel 39 in the direction indicated by arrow 59 of FIG. 7 will cause the turbine-compressor assembly 25 to rotate counterclockwise, in the direction indicated by arrow 57 about the axis 43. Consequently, air is drawn toward the rotating compressor wheel 47, as indicated by arrow 61.

Whilst in the presently described embodiment the turbine wheel 39 nests, wholly or partially, within the compressor wheel 47 in other embodiments the arrangement may be vice-versa so that the compressor wheel nests wholly or partially within the turbine wheel so that in some embodiments the outer wheel acts as the turbine wheel whilst the inner wheel acts as the compressor wheel.

Returning again to FIG. 6, there is presented a cross sectional view of the turbine-compressor assembly 25 including the turbine wheel 39 and the compressor wheel 47. Also in this view are associated turbine fluid inlet pipe 63 and compressor outlet pipe 85, which feed fluid in the form of air to the turbine wheel 39 and from the compressor wheel 47, respectively. The turbine fluid inlet pipe 63 defines a fluid inlet pipe opening 65 that is continuous with fluid inlet port 33 (FIG. 2).

A first fluid path 67, indicated by a series of arrows, extends from the fluid inlet port 33, through fluid inlet pipe opening 65, through turbine fluid inlet pipe 63, through turbine inlet nozzles 69 and through space 71 between an outer wall 73 of the turbine wheel 39 and an inner wall 75 of compressor wheel 47.

A second fluid path 77, indicated by a series of arrows, extends between outer wall 81 of compressor wheel 47 and compressor housing 83. Compressor housing 83 is shaped to form the compressor outlet pipe 85 which forms part of the second fluid path 77. The second fluid path 77 extends from an inlet 87 to the exhaust fluid outlet 35 (FIG. 3), which is continuous with the compressor outlet pipe 85.

An axle, concentric with axis 43 and being in the form of shaft 89 extends through a central bore 97 of the turbine wheel 39. The shaft 89 extends from a support member 91 which in the presently described embodiment comprises a portion of the outside of the turbine fluid inlet pipe 63. A base 93 of the shaft 89 is oversized and complements a first counterbored portion 95 of the central bore 97.

A head 99 of the shaft 89 is oversized and is received into a second counterbored portion 101 of the nose 45 of hub 44. The head 99 attaches to the shaft 89 by means of a bolt 103 that is threadedly received into an axial hole formed into the shaft 89 so that the turbine wheel is captured on the shaft 89. A cap 105 covers the bolt 103. Accordingly, in such an embodiment the turbine wheel 39 and the compressor wheel 47 rotate about the shaft 89. The turbine wheel 39 is lubricated to rotate about the fixed shaft 89. The lubrication may be grease or oil though air or a magnetic non-contact bearing might be used. It will be realized that other, less preferred, arrangements for the shaft 89 are possible. For example, in some other embodiments the shaft may be rotationally coupled to the support member 91 so that the shaft rotates relative to the support member 91 and the turbine wheel 39 and the compressor wheel 47 rotate with the axle in the form of the shaft 89.

The turbine wheel 39 and compressor wheel 47 which is fastened thereto, are free to rotate about the shaft 89 in the embodiment of FIG. 6.

Figure 10:
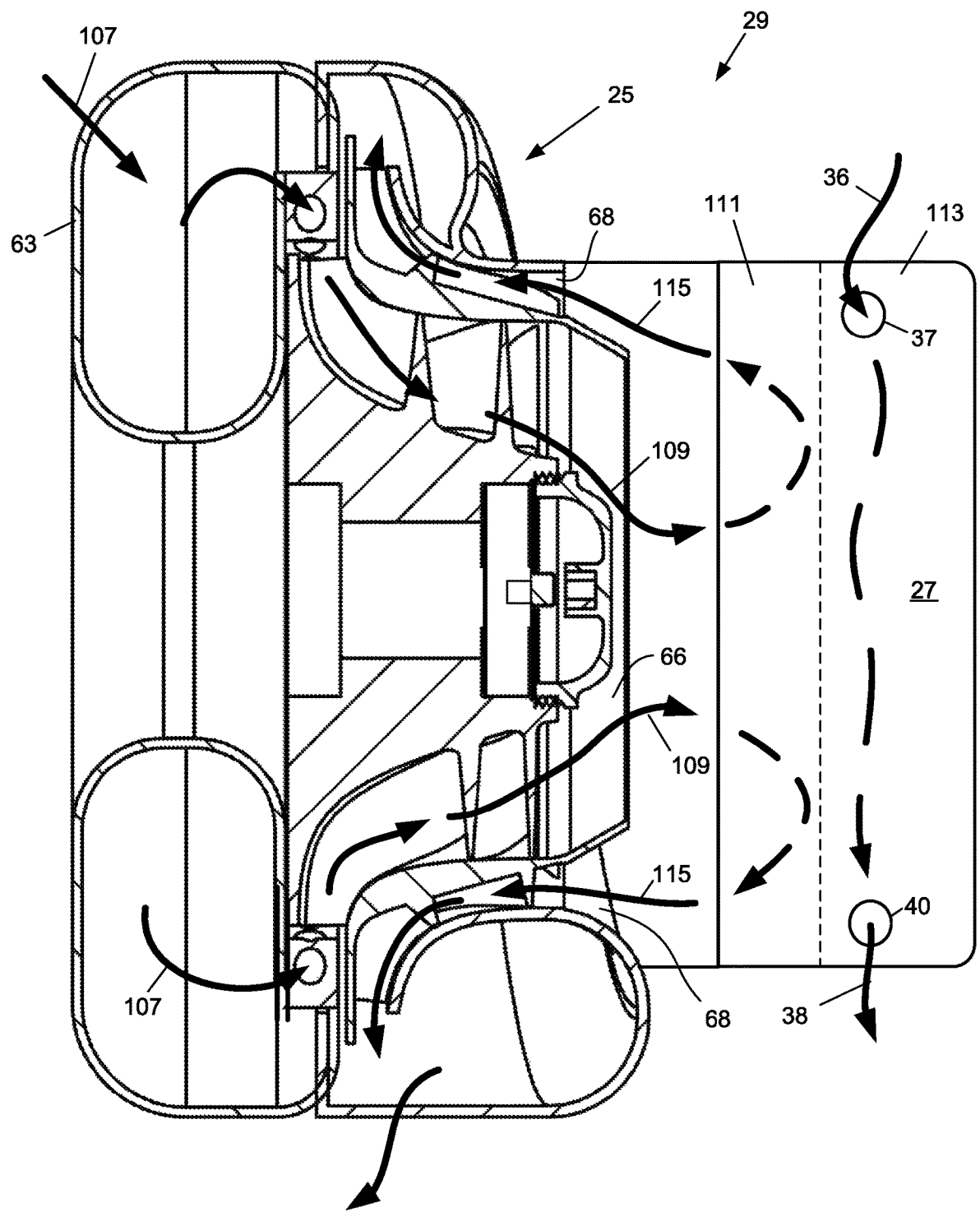
FIG. 10 is a further cross-sectional view of the turbine-compressor assembly indicating flow of fluid therethrough and shown with a heat exchanger attached.

FIG. 10 shows the turbine-compressor assembly 25 in cross sectional view and connected to the heat exchanger 27. In use, fluid inlet port 33 is connected to a source of pressurized ambient air such as RAM air so that RAM air 107 flows into turbine fluid inlet pipe 63 and thence proceeds through the first fluid path 67 (identified in FIG. 6) and out first fluid path outlet 66. The passage of the air along the first fluid path 67 imparts force on the pitched turbine blades 41 so that the turbine wheel 39 and the compressor wheel 47 to which it is fastened rotate. The RAM air expends energy in rotating the turbine wheel 39 and the compressor wheel 47 so that it exits the turbine wheel as outgoing air stream 109 with reduced temperature and lowered pressure. The outgoing air stream 109 then enters a first side 111 of heat exchanger 27. Fluid 36, which is warm, simultaneously enters warm fluid inlet port 37 and flows through a second side 113 of heat exchanger 27. Heat from the warm fluid passes from the second side 113 of the heat exchanger 27 to the first side 111 so that cooled fluid 38 exits fluid outlet port 40. The cooled fluid 38 can then be used as desired. For example, it may be circulated around hardware that requires cooling, such as electronic assemblies. Alternatively, it may be used to cool a passenger cabin in an aircraft, train, or other high-speed vehicle where RAM air is available.

The air stream 115 exiting the first side 111 of heat exchanger 27 is warmed by its passage through the heat exchanger. The air stream 115 then passes into second fluid path inlet 68 and along the second fluid path 77 which takes it through rotating compressor blades 49 of the compressor wheel 47. The air stream 115 is pressurized by the action of the blades of the compressor which are rotated by the turbine, thereby causing the compressor wheel and the turbine wheel to expend energy on the air stream 115. That energy is acquired from the RAM air 107 and thus the temperature and pressure of the RAM air 107, which is incoming, lowers to produce the outgoing air stream 109 that enters the first side of the heat exchanger 27.

Whilst the turbine-compressor assembly 25 that has been described has been explained in its application to a heat exchanger, to thereby form an ACM, the turbine-compressor assembly 25 may find use in other applications. For example, it may be used as a turbo charger in which case the pressurised fluid applied to the turbine inlet pipe may comprise pressurised engine exhaust gases from an engine that travel along the first fluid path to turn the compressor wheel. Air would flow through the compressor blades 49 of the compressor wheel 47 along the second fluid path 77 to forcibly aspirate the engine in order to improve its power output.

For construction of the turbine-compressor assembly 25 it is preferred that the turbine wheel and the compressor wheel are separately machined out of aluminium. They are then preferably brazed to fasten them together. Welding, casting, 3d printing or other suitable fabrication techniques may also be used.

Embodiments of the invention provide a compact turbine-compressor assembly that is believed to have less rotating mass, lower forces on bearings, higher angular acceleration/responsiveness, and higher efficiencies than equivalent output prior art turbine-compressor assemblies.

Figure 1:
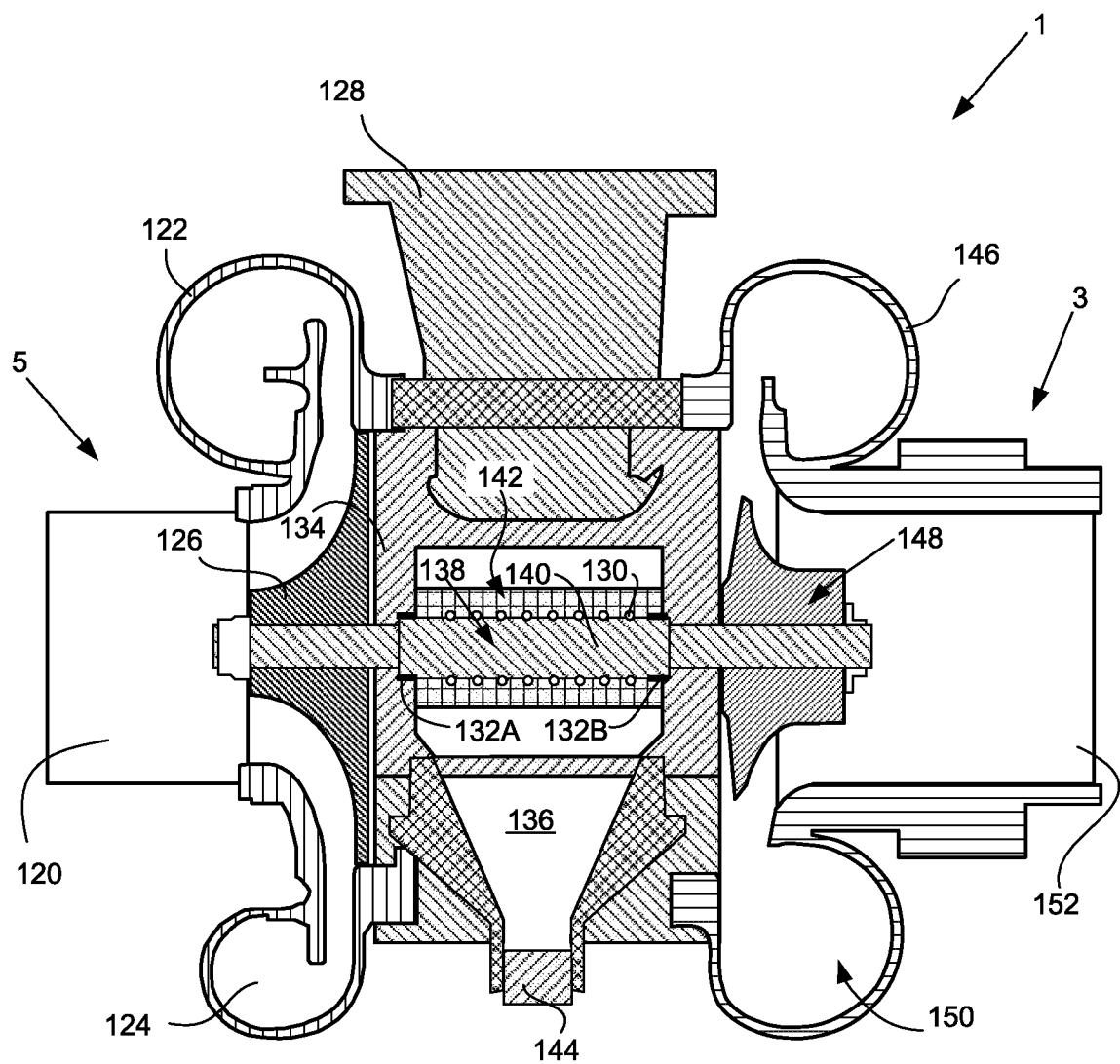
FIG. 1 illustrates a prior art turbine-compressor assembly.
Figure 11:
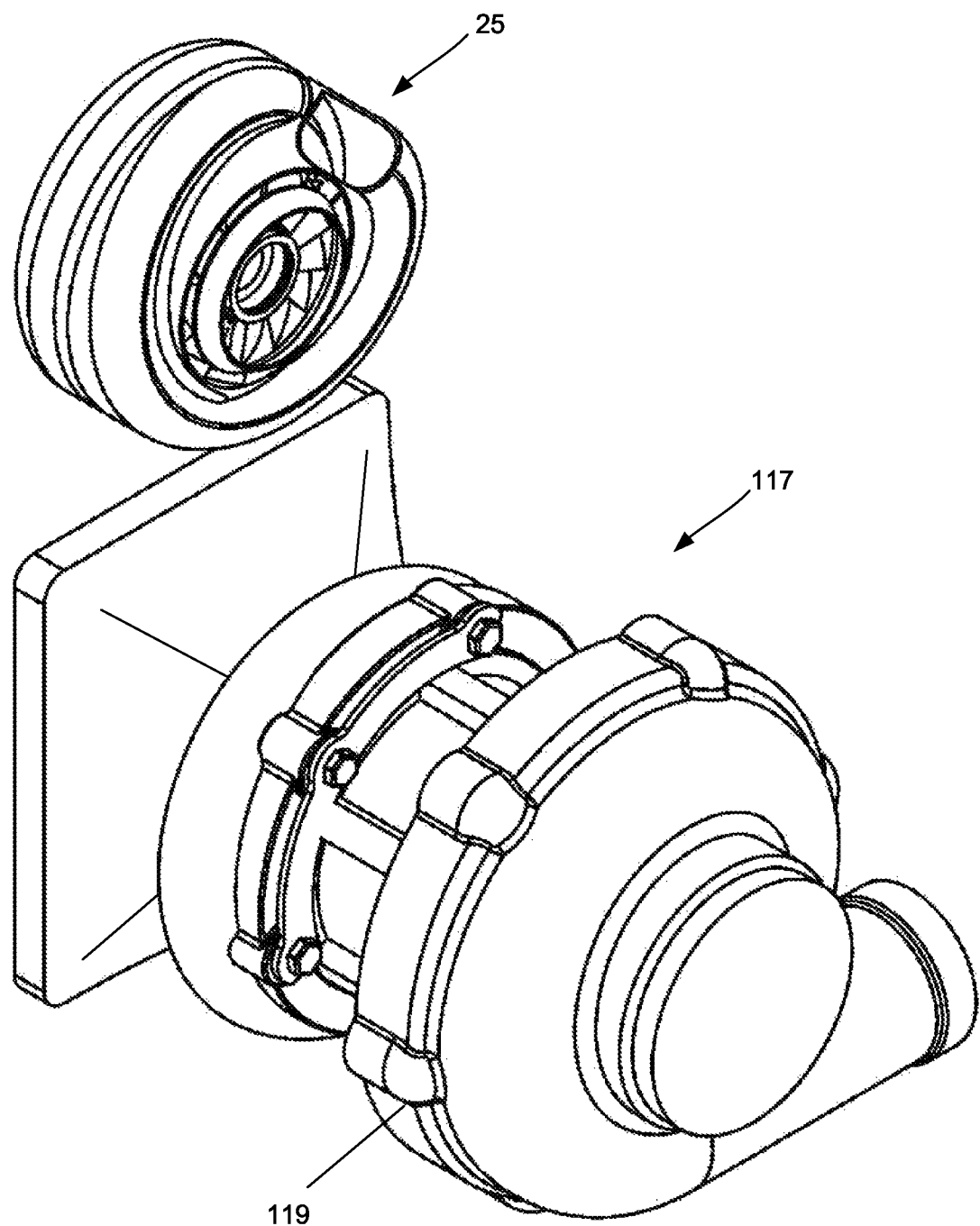
FIG. 11 shows a compact turbine-compressor assembly according to an embodiment herein in contrast to a prior art design compact turbine-compressor assembly of comparable output.

FIG. 11 depicts a compact turbine-compressor assembly 25 according to an embodiment of the present invention alongside a prior art turbine-compressor assembly 117 of similar design to that of FIG. 1. In FIG. 11, the compact turbine-compressor assembly 25 and the prior art turbine-compressor assembly 117 have similar output power for driving a given heat exchanger. It will be observed that the compact turbine-compressor assembly 25 occupies significantly less space than the prior art turbine-compressor assembly 117. In FIG. 11 the axial length of the compact turbine-compressor assembly 25 is 87 mm and its outer diameter is 139 mm. In contrast the axial length of the prior art turbine-compressor assembly 117 is 283 mm and the diameter of the turbine scroll casing 119 is 220 mm.

From the foregoing it will be understood that in an embodiment there is provided a turbine-compressor assembly 25. The turbine-compressor assembly 25 includes a turbine wheel 39 with one or more turbine blades 41 and a compressor wheel 47 that includes one or more compressor blades 49. The compressor wheel 47 is concentric with the turbine wheel 39. Furthermore, the compressor wheel 47 and the turbine wheel 39 are not located at opposite ends of a common axle with a medial portion of the axle distancing them apart, as is the case with the prior art turbine-compressor assembly that has been discussed with reference to FIG. 1. In contrast, the turbine wheel 39 and the compressor wheel 47 are located adjacent to each other and in the presently described embodiment they axially overlap each other so that one nests within the other, as seen for example in FIG. 8.

The turbine-compressor assembly 25 includes a first fluid path 67 which is configured to convey fluid, which will typically be air, through the turbine blades 41. The turbine-compressor assembly 25 also includes a second fluid path 77 which is configured to convey fluid, which will typically be air, through the compressor blades. As can be seen in FIG. 6, the turbine-compressor assembly 25 is arranged so that the first fluid path 67 is distinct from the second fluid path 77 and vice-versa.

An axle, in the form of shaft 89, extends from a support member 91 with the turbine wheel 39 and the compressor wheel 47 arranged to rotate with or about the axle.

Figure 9:
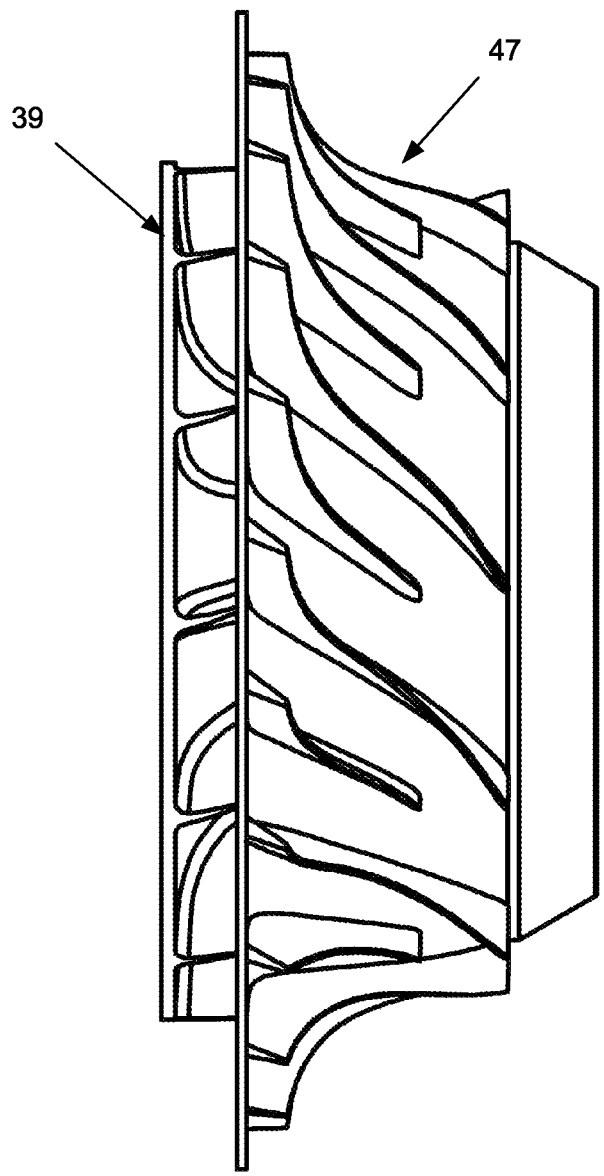
FIG. 9 is a side view of the turbine wheel and the compressor wheel.

In embodiments the turbine wheel 39 locates partially or entirely within the compressor wheel 47 or vice-versa. For example, in FIG. 8 and FIG. 9 the turbine wheel 39 is shown radially located within the compressor wheel 47 and axially offset, so that a portion of the turbine wheel 39 can be seen extending leftward of the compressor wheel 47 in those Figures.

The first fluid path 67 may comprise a turbine fluid inlet pipe 63 fixed relative to the support member 91.

A portion of the second fluid path 77 may comprise a compressor outlet pipe 85 that is fixed relative to the support member 91. The second fluid path may comprise an exhaust fluid outlet 35 continuous with the compressor outlet pipe 85.

A portion of the first fluid path 67 may be defined by a space 71 between an inner wall 75 of the compressor wheel 47 and an outer wall 73 of the turbine wheel 39.

A portion of the second fluid path 77 is defined by a space between an outer wall 81 of the compressor wheel 47 and a compressor housing 83. The axle comprises a shaft 89. which may extend through a central bore 97 of the turbine wheel 39.

A bore in the form of central bore 97 may receive the shaft 89. The central bore 97 may be formed axially through the turbine-compressor assembly.

The turbine-compressor assembly 25 may include a heat exchanger 27 to thereby provide an ACM 29. The heat exchanger 27 may include a first side 111 which is arranged for passage of air from a first fluid path outlet 66 (FIG. 10) of the first fluid path 67 to a second fluid path inlet 68 of the second fluid path 77. The heat exchanger 27 includes a second side 113 for conveying a fluid 36 to be cooled.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the scope of the invention.

The invention claimed is:

1. A turbine-compressor assembly comprising:
 a turbine wheel, including one or more turbine blades;
 a compressor wheel including one or more compressor blades, the compressor wheel being concentric with and adjacent to the turbine wheel;
 a first fluid path configured to convey fluid through the turbine blades;
 a second fluid path configured to convey fluid through the compressor blades and distinct from the first fluid path; and
 an axle extending from a support member with the turbine wheel and the compressor wheel rotatable with or about the axle, wherein the turbine wheel locates partially or entirely within the compressor wheel or vice-versa;
 wherein the turbine-compressor assembly includes a heat exchanger to thereby provide an air-cycle machine (ACM); and
 wherein the heat exchanger includes a first side arranged for passage of air from an outlet of the first fluid path to an inlet of the second fluid path, and wherein the inlet and outlet share a common rotating edge, and fluid passes across the common rotating edge from the outlet to the inlet.

2. The turbine-compressor assembly of claim 1, wherein the turbine blades have an opposite pitch to the compressor blades.

3. The turbine-compressor assembly of claim 1, wherein the first fluid path comprises a turbine fluid inlet pipe fixed relative to the support member.

4. The turbine-compressor assembly of claim 1, wherein a portion of the second fluid path comprises a compressor outlet pipe fixed relative to the support member.

5. The turbine-compressor assembly of claim 4, wherein the second fluid path comprises an exhaust fluid outlet continuous with the compressor outlet pipe.

6. The turbine-compressor assembly of claim 1, wherein a portion of the first fluid path is defined by a space between an inner wall of one of the compressor wheel or the turbine wheel and an outer wall of a nested other of the one of the compressor wheel or the turbine wheel.

7. The turbine-compressor assembly of claim 1, wherein a portion of the second fluid path is defined by a space between an outer wall of the compressor wheel and a compressor housing.

8. The turbine-compressor assembly of claim 1, wherein the axle comprises a shaft.

9. The turbine-compressor assembly of claim 8, wherein a bore which receives the shaft is formed axially through the turbine-compressor assembly.

10. The turbine-compressor assembly of claim 1, wherein the heat exchanger includes a second side for conveying a fluid to be cooled.

\* \* \* \* \*